United States Patent Office 2,966,477
Patented Dec. 27, 1960

2,966,477

RUBBER COMPOSITIONS AND METHOD OF MAKING SAME

Roger E. Morris, Cuyahoga Falls, Ohio, assignor to The B. F. Goodrich Company, New York, N.Y., a corporation of New York No Drawing. Filed June 12, 1957, Ser. No. 665,111

12 Claims. (Cl. 260—45.95)

This invention relates to rubber compositions which are subject to deterioration on aging, and more particularly pertains to rubber compositions, including vulcanized rubber compositions, which possess unusually high flex-cracking resistance, excellent resistance to deterioration on aging, and are non-staining and non-discoloring, when used in light-colored and white rubber compositions, and also when used in black rubber compositions which are vulcanized in contact with white or light-colored layers of rubber, such as white side-wall automobile tires.

It is recognized that the properties of the vulcanized rubber compositions of which automobile tires are made should have very high resistance to flex-cracking, since the rotation of the tire on the road causes a considerable degree of continuous and rapidly repeated flexing of the rubber compositions of the tire, with the inevitable result that the rubber compositions in time develop cracks which grow with use of the tire to a point where tire failure may result, unless means are taken to prevent such failures.

It is also well known that vulcanized rubber compositions deteriorate with age and use, due to the action of circumambient media, the rate of deterioration being dependent upon the oxygen and ozone content of the atmosphere and the amount of sunlight to which the rubber compositions are exposed, as well as the temperature of, and tension imposed upon, the rubber compositions during their useful life.

It has previously been the practice to embody in rubber compositions before vulcanization antioxidants of the diarylamine type. These antioxidants, while effective to a certain degree as flex-cracking retarders and as age-resisters, have the property of staining and discoloring rubber compositions, particularly on exposure to sunlight, and hence are not suitable for the rubber compositions used in the manufacture of white side-wall automobile tires, even in the carbon black rubber compositions of the tire body. Where the carbon black rubber compositions of the tire carcass contain diarylamine antioxidants, all of which have staining and discoloring properties to a greater or less extent, the staining antioxidant migrates slowly from the rubber composition of the carcass into the white side-wall stock and in time effects a permanent and unattractive staining and discoloration of the white side walls.

Heretofore, various non-staining and non-discoloring deterioration retarders have been used in rubber compositions to overcome the above mentioned undesirable properties, and, while they do not cause serious staining or discoloration, they are relatively weak in imparting flex-cracking resistance and aging resistance to rubber compositions, and hence are unsatisfactory in the rubber compositions of white side-wall automobile tires, and like rubber products.

There is consequently a need for vulcanized rubber compositions having high resistance to flex-cracking, high resistance to aging deterioration, and non-staining, non-discoloring properties, in a satisfactorily high degree of efficiency to produce the superior quality rubber products required to meet present-day standards.

It is to vulcanized rubber compositions having all three of these desirable properties, hereinabove enumerated, that this application is directed.

The term "rubber" is employed in this application in a broad generic sense to include sulfur vulcanizable natural and synthetic unsaturated rubbery polymeric diene rubbers, which are similar from the standpoint of aging in that each of them is slowly oxidizable upon exposure to the atmosphere, including the various natural crude rubbers, which are regarded as naturally-occurring isoprene polymers, and such synthetic rubbers as polymers of conjugated dienes, such as butadiene-1,3, isoprene, 2-methyl butadiene-1,3, and other butadiene-1,3 hydrocarbons, chloroprene, cyano butadiene-1,3, etc., as well as copolymers of these conjugated dienes with each other or with other unsaturated compounds copolymerizable therewith, such as styrene, chlorostyrene, isobutylene, acrylonitrile, methacrylonitrile, acrylic and methacrylic acids, alkyl acrylates and methacrylates, vinylidene chloride, vinyl pyridine, and the like, such diene rubbers as a class being herein sometimes referred to as "oxidizable polymeric diene rubber."

I have discovered that a vulcanized rubber composition of the character hereinabove indicated may be produced by incorporating into a vulcanizable rubber composition as a deterioration retarder the reaction product of a hydrocarbon substituted phenol and an allyl halide. The hydrocarbon substituted phenols found to be preferable are the mono- and di-hydrocarbon substituted phenols. The mono-hydrocarbon substituted phenols include the cresols, namely, the ortho-, meta- and para-methyl phenols, and the di-hydrocarbon substituted phenols include the xylenols, such as the 2,3-, 2,4-, 2,5-, 2,6-, 3,4-, and 3,5-dimethyl phenols. In place of the methyl group in each of the above named compounds, other hydrocarbon radicals may be substituted within the definition of "hydrocarbon substituted" below. The allyl halide may be an allyl chloride, bromide or iodide, and may be a hydrocarbon substituted allyl halide. From experience to date, allyl chloride, methallyl chloride, ethallyl chloride, and the like have been found to be more effective. The reaction is preferably carried out in the presence of an acid catalyst, such as a Friedel-Crafts type type catalyst. The amount of the catalyst is not critical, and amounts ranging from 5 to 95 weight percent on the hydrocarbon substituted phenol may be used. Normally, about 0.05 to 0.2 mol of the catalyst to 1 mol of the substituted phenol gives satisfactory results.

The reaction products of this invention may be made in either a one stage or a two stage process. Thus, the one stage process may be generally represented by the following equation:

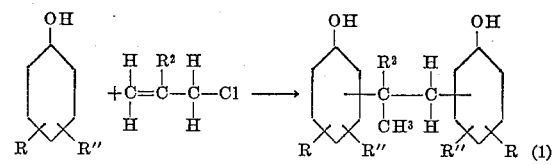

Alternatively, the reaction products of this application may be prepared by the reaction of an alkylated phenol containing an alyl group attached to the nucleus with an alkylated phenol containing an open reactive position. This reaction is represented by the following equation:

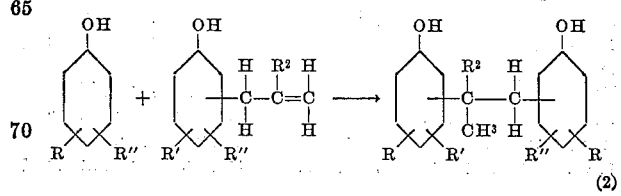

In the above Equations 1 and 2, each R and R' represents the same or a different monovalent substituent selected from the class consisting of hydrogen and an alkyl radical selected from the class consisting of methyl and propyl; R" represents the same or a different alkyl radical selected from the class consisting of methyl and propyl; and $R^2$ represents a monovalent substituent selected from the class consisting of hydrogen and an alkyl radical having from 1 to 2 carbon atoms. The R" group of each of the phenyl rings may be positioned either ortho, meta or para to the OH group; the substituents R and R' may be in any of the positions ortho, meta or para to the OH group not occupied by a R" group; and the bridging 1,2-alkane group may be joined to a carbon atom of each of the two phenyl groups in any free position, preferably ortho or para to the OH group, not occupied by the hydrocarbon groups of the starting hydrocarbon substituted phenols.

The deterioration retarders of this application can be readily admixed with rubber and rubber compositions at any time prior to vulcanization, as at the same time other compounding ingredients are added, which is a preferred way for natural rubber compositions. In the case of synthetic rubbers which are ordinarily prepared by polymerization in an aqueous medium, it may be advantageous to add the deterioration retarder in an aqueous dispersion or emulsion to the synthetic rubber latex as it comes from the polymerizer. In this way, when the synthetic rubber is recovered from the latex by coagulation, the deterioration retarder is already uniformly distributed throughout the mass of the synthetic rubber, so that the rubber is protected against deterioration from the time it is made until it is compounded for use. This makes it unnecessary to add the deterioration retarder during the compounding of the rubber, although more of the deterioration retarder can be added with the other compounding ingredients in the event any specific rubber composition may indicate such a course to be desirable.

The amount of the deterioration retarder which may be employed in rubber and rubber compositions ranges from about 0.1 to about 10 weight percent based on the rubber, whereas to obtain a maximum value of a deterioration retarder of this application as a very highly efficient flex-cracking resistant age-resister, an amount ranging from about 0.5 to about 5 weight percent on the rubber will normally give adequate protection, although for most uses in rubber compounding about one weight percent of the deterioration retarder on the rubber may be satisfactorily employed.

The following examples are to be understood to be illustrative only since numerous modifications and variations will be apparent to those skilled in the art.

EXAMPLE I

The reaction of the hydrocarbon substituted phenols with the allyl halides may be carried out in a three-necked round bottom reactor equipped with a rotary blade stirrer, a reflux condenser, thermometer, a dropping funnel for introducing liquids, a gas inlet tube, a heating mantle and calcium chloride drying tubes.

Into the reactor is charged 122 g. (1 mol) of 3,4-dimethylphenol, 75 ml. of chlorobenzene, as an inert vehicle of the reaction, and 13.7 g. (0.1 mol) of anhydrous zinc chloride as the catalyst. The reaction flask is flushed with dry nitrogen gas for about half an hour to provide an inert blanket over the reactor contents. The mixture is stirred well and 38 g. (0.5 mol) of allyl chloride is added dropwise over a period of about half an hour. The evolution of HCl gas proceeds rather rapidly for a period of about one and one-half hours while the temperature is maintained at around 32° to 40° C. Then, heating is continued for about two hours at 50° to 60° C. to complete the reaction. The reaction mixture is poured into ice water and mush forms. The solids are collected by suction filtration, washed with hexane and dried. A sample was recrystallized from a 50-50 benzene-hexane solution for analysis, which check for $C_{19}H_{24}O_2$ or 1,2-bis(2-hydroxy-4,5-dimethylphenyl) propane. It is the practice, however, not to isolate the crystalline material for use as the deterioration retarder, but to utilize the entire reaction product.

*Evaluation of reaction product of Example I*

In evaluating the deterioration retarders of this application in oxidizable polymeric diene rubber compositions, approved standard procedures are followed.

TEST RECIPE

| Constituents: | Parts by weight |
|---|---|
| Natural rubber | 100 |
| Carbon black (EPC) | 50 |
| Zinc oxide | 5 |
| Stearic acid | 1 |
| Sulfur | 3 |
| Dibenzothiazyl disulfide | 1 |
| Deterioration retarder | 1 |

*Preparing test pieces*

Two oxidizable polymeric diene rubber compositions of the above recipe, one with the deterioration retarder and the other without the deterioration retarder, are compounded and vulcanized in 6" x 6" by 0.08" pads for 50 and 80 minutes at 280° F. Test pieces (dumbbells) are cut from the vulcanized pads, all in accord with standard ASTM procedure.

For tensile tests, a standard Scott tensile testing machine is used. For aging the test pieces, each test piece is placed in a separate open test tube and maintained for 24 and 48 hours at 212° F. For flex-life tests, the test pieces cured for 50 minutes are test-tube aged for 24 hours at 212° F. The flexing test is carried out at 212° F. in a De Mattia flexing machine which automatically records the number of flexures, the tests being run to a rating of 10, which represents severe cracking completely across the test piece.

RESULTS OF TESTS

| Test Pieces | Percentage of Original Tensile Strength Retained After Aging at 212° F. | | | | Flex-Life | |
|---|---|---|---|---|---|---|
| | 24 Hrs. Aging | | 48 Hrs. Aging | | No. of Flexures to 10 | Improvement Over Blank |
| | 50" Cure | 80" Cure | 50" Cure | 80" Cure | | |
| Blank—No Deterioration Retarder | 62 | 53 | 38 | 31 | 21,000 | 1.0 |
| Reaction Product—Example I | 94 | 87 | 78 | 67 | 225,000 | 10.5 |

From the preceding tabulation, it will be observed that the deterioration retarding life-aging properties of the vulcanized rubber composition containing the reaction product of Example I is outstanding and the flex-life of the rubber composition is very high, being more than 10 times that of the blank control.

EXAMPLE II

The reaction product of 2,6-diisopropylphenol with allyl chloride likewise imparts to rubber compositions outstanding physical properties and particularly very high flex-life.

Utilizing the same apparatus as in Example I, the reactor is charged with 178 g. (1 mol) of 2,6-diisopropylphenol and 4 g. of anhydrous zinc chloride is added with stirring. Then 38 g. (0.5 mol) allyl chloride is added dropwise with stirring at room temperature. The mixture is then heated gradually to 140° C. until the evolution of HCl has nearly stopped, approximately six hours. The reaction mixture is allowed to cool, diluted with about 200 ml. of benzene, and poured into ice water containing 20 ml. of concentrated hydrochloric acid. The resulting liquid is separated into an organic layer and a water layer. The organic layer is diluted with 300 ml. of additional benzene, is washed with water, sodium bicarbonate solution and water. After drying over anhydrous magnesium sulfate, the benzene is removed by distillation. Distillation in vacuo, separates the unreacted 2,6-diisopropylphenol. A viscous orange colored syrup is collected over a range of 163–183° C. at 0.2 mm. Analysis shows the syrup to be largely 1,2-bis(4-hydroxy-3,5-diisopropylphenyl)propane.

The viscous orange colored syrup was evaluated as a deterioration retarder in oxidizable polymeric diene rubber compositions in the same maner that the reaction product of Example I was tested, with the following results:

RESULTS OF TESTS

| Test Pieces | Percentage of Original Tensile Strength Retained After Aging at 212° F. | | | | Flex-Life | |
|---|---|---|---|---|---|---|
| | 24 Hrs. Aging | | 48 Hrs. Aging | | No. of Flexures to 10 | Improvement Over Blank |
| | 50″ Cure | 80″ Cure | 50″ Cure | 80″ Cure | | |
| Blank—No Deterioration Retarder | 62 | 53 | 38 | 35 | 21,000 | 1.0 |
| Reaction Product—Example II | 88 | 76 | 63 | 54 | 220,000 | 10.5 |

From the preceding tabulation, it will be observed that the deterioration retarding life-aging properties of the sulfur vulcanized oxidizable polymeric diene rubber compositions containing the reaction product of Example II are outstanding and the flex-life of the rubber compositions is very high, being more than 10 times that of the blank control.

EXAMPLE III

As has been indicated above, the deterioration retarders of the invention of this application may be produced in a two stage process, as by reacting an alkylated phenol with an allyl halide in the presence of a base to produce an allyl ether of an alkylated phenol which, after rearrangement to an allyl substituted alkylated phenol, is reacted with another alkylated phenol, in the presence of an acid catalyst, to produce a 1,2-bis(hydroxy-dialkylphenyl)-propane. Such a two stage process has the advantage over the one stage process of Examples I and II in that the alkylated phenol used in the second stage may be a different alkylated phenol than that used in the first stage.

*Stage 1.*—In the apparatus of Example I, charge the reactor with 122 g. (1 mol) of 3,4-dimethylphenol, 145 g. (1.2 mol) of allyl bromide, 170 g. (1.2 mol) of anhydrous potassium carbonate and 250 g. of acetone, and stir at reflux for eight hours. After cooling, water is added. Then the product is taken up in ether and washed with a 10% aqueous sodium hydroxide solution. The ether solution is dried over anhydrous potassium carbonate and, after removal of the ether, is distilled under reduced pressure ot give the allyl-3,4-dimethylphenyl ether. The latter is then allowed to reflux for eight hours to rearrange to 2-allyl-4,5-dimethylphenol, which can be used directly in stage 2 or can be first purified by distillation.

*Stage 2.*—A solution of 81 g. (0.5 mol) of 2-allyl-3,4-dimethylphenol, from stage 1, in 50 ml. of chlorobenzene, is added dropwise to a solution of 89 g. (0.5 mol) of 2,6-diisopropylphenol and 13.7 g. (0.1 mol) of anhydrous zinc chloride in 100 ml. of chlorobenzene. The reactor contents are heated with stirring at about 120° C. for several hours. The reaction mixture is allowed to cool, is then diluted with about 200 ml. of an inert solvent, such as benzene, and the diluted reactor contents poured into ice water containing about 20 ml. of concentrated hydrochloric acid. The resulting liquid is separated into an organic layer and a water layer. The organic layer is diluted with 300 ml. of additional benzene, is washed with water, sodium bicarbonate solution and with water, is then dried over anhydrous magnesium sulfate. The benzene is removed from the washed and dried organic layer by distillation, and the residue is distilled in vacuo to remove unreacted constituents. A viscous somewhat dark colored liquid is collected over a range of 180°–196° C. at 0.2 mm., largely, 1-(2-hydroxy-4,5-dimethylphenyl)-2-(4-hydroxy-3,5-diisopropylphenyl) propane.

This two stage reaction product is evaluated as a deterioration retarder in oxidizable polymeric diene rubber compositions in the same manner as was the reaction product of Example I with the following results:

RESULTS OF TESTS

| Test Pieces | Percentage of Original Tensile Strength Retained After Aging at 212° F. | | | | Flex-Life | |
|---|---|---|---|---|---|---|
| | 24 Hrs. Aging | | 48 Hrs. Aging | | No. of Flexures to 10 | Improvement Over Blank |
| | 50″ Cure | 80″ Cure | 50″ Cure | 80″ Cure | | |
| Blank—No Deterioration Retarder | 62 | 53 | 38 | 35 | 21,000 | 1.0 |
| Reaction Product—Example III | 90 | 82 | 70 | 61 | 196,000 | 9.4 |

EXAMPLES IV TO VII

Following the procedure of Example I, numerous reaction products were made and tested in oxidizable polymeric diene rubber compositions the same as the reaction product of Example I, of which the following are typical:

Example IV—Reaction product of o-cresol and allyl chloride;

Example V—Reaction product of o-cresol and methallyl chloride;

Example VI—Reaction product of p-cresol and allyl chloride;

Example VII—Reaction product of 3,4-dimethylphenol and methallyl chloride.

Each of the above reaction products was found to have the percentage of original tensile strength after aging and flex-life, when tested in the same manner as Example I, as follows:

RESULTS OF TESTS

| Test Pieces | Percentage of Original Tensile Strength Retained, After Aging at 212° F. | | | | Flex-Life | |
|---|---|---|---|---|---|---|
| | 24 Hrs. Aging | | 48 Hrs. Aging | | No. of Flexures to 10 | Improvement Over Blank |
| | 50″ Cure | 80″ Cure | 50″ Cure | 80″ Cure | | |
| Blank | 62 | 53 | 38 | 35 | 21,000 | 1.0 |
| Reaction Product—Example IV | 90 | 73 | 68 | 54 | 143,000 | 7.0 |
| Reaction Product—Example V | 84 | 74 | 69 | 53 | 128,000 | 6.1 |
| Reaction Product—Example VI | 75 | 65 | 57 | 48 | 169,000 | 8.0 |
| Reaction Product—Example VII | 79 | 76 | 64 | 53 | 144,000 | 7.0 |

It is to be understood the very high flex-cracking resistant sulfur vulcanized oxidizable polymeric diene rubber compositions herein specifically set forth are illustrative only and that other very high flex-cracking resistant oxidizable polymeric diene rubber compositions may be produced by the incorporation thereinto of other reaction products of hydrocarbon substituted phenols and allyl halides than the specific reaction products hereinabove mentioned. Rubber vulcanization embodying the reaction products of hydrocarbon substituted phenols and allyl halides, whether the rubber be natural or synthetic, have notably high flexcracking resistance, as well as excellent aging resistance and in addition are non-staining and non-discoloring, characteristics which are desirable in any rubber product but which are highly important in white and light-colored rubber products such as white side-wall tires.

It is to be understood that the invention of this application is not limited to the specific disclosures herein set forth, which have been presented as illustrations, since modifications in the proportions and types of materials employed may be varied and equivalent materials may be employed, where desirable, without departing from the spirit and scope of the invention as defined in the appended claims.

What is claimed is:

1. An oxidizable polymeric diene rubber composition containing as a deterioration retarder from 0.1 to 10.0 weight percent on the rubber of a chemical compound selected from the class consisting of 1,2-bis(2-hydroxy-4,5-dimethylphenyl)propane; 1,2-bis(4-hydroxy-3,5-diisopropylphenyl)propane; and 1-(2-hydroxy-4,5-dimethylphenyl)-2-(4-hydroxy-3,5-diisopropylphenyl)propane.

2. An oxidizable polymeric diene rubber composition containing as a deterioration retarder from 0.1 to 10.0 weight percent on the rubber of a chemical compound comprising 1,2-bis(2-hydroxy-4,5-dimethylphenyl)propane.

3. An oxidizable polymeric diene rubber composition containing as a deterioration retarder from 0.1 to 10.0 weight percent on the rubber of a chemical compound comprising 1,2-bis(4-hydroxy-3,5-diisopropylphenyl)propane.

4. An oxidizable polymeric diene rubber composition containing as a deterioration retarder from 0.1 to 10.0 weight percent on the rubber of a chemical compound comprising 1-(2-hydroxy-4,5-dimethylphenyl)-2-(4-hydroxy-3,5-diisopropylphenyl)propane.

5. A sulfur-vulcanized oxidizable polymeric diene rubber composition highly resistant to flex-cracking and having excellent aging non-staining non-discoloring properties, in which composition is dispersed prior to vulcanzation as a deterioration retarder from 0.1 to 10.0 weight percent on the rubber of a chemical compound selected from the class consisting of 1,2-bis(2-hydroxy-4,5-dimethylphenyl)propane; 1,2-bis(4-hydroxy-3,5-diisopropylphenyl)propane; and 1-(2-hydroxy-4,5-dimethylphenyl)-2-(4-hydroxy-3,5-diisopropylphenyl)propane.

6. A sulfur-vulcanized oxidizable polymeric diene rubber composition highly resistant to flex-cracking and having excellent aging non-staining non-discoloring properties, in which composition is dispersed prior to vulcanization as a deterioration retarder from 0.1 to 10.0 weight percent on the rubber of a chemical compound comprising 1,2-bis(2-hydroxy-4,5-dimethylphenyl)propane.

7. A sulfur-vulcanized oxidizable polymeric diene rubber composition highly resistant to flex-cracking and having excellent aging non-staining non-discoloring properties, in which composition is dispersed prior to vulcanization as a deterioration retarder from 0.1 to 10.0 weight percent on the rubber of a chemical compound comprising 1,2-bis(4-hydroxy-3,5-diisopropylphenyl)propane.

8. A sulfur-vulcanized oxidizable polymeric diene rubber composition highly resistant to flex-cracking and having excellent aging non-staining non-discoloring properties, in which composition is dispersed prior to vulcanization as a deterioration retarder from 0.1 to 10.0 weight percent on the rubber of a chemical compound comprising 1-(2-hydroxy-4,5-dimethylphenyl)-2-(4-hydroxy-3,5-diisopropylphenyl)propane.

9. The method of producing a sulfur-vulcanized oxidizable polymeric diene rubber product highly resistant to flex-cracking and having excellent aging, non-staining and non-discoloring properties, which method comprises sulfur-vulcanizing a vulcanizable oxidizable polymeric diene rubber composition in which has been incorporated prior to vulcanization from 0.1 to 10.0 weight percent on the rubber of a chemical compound selected from the class consisting of 1,2-bis(2-hydroxy-4,5-dimethylphenyl)propane; and 1-(2-hydroxy-4,5-dimethylphenyl)-2-(4-hydroxy-3,5-diisopropylphenyl)propane.

10. The method of producing a sulfur-vulcanized oxidizable polymeric diene rubber product highly resistant to flex-cracking and having excellent aging, non-staining and non-discoloring properties, which method comprises sulfur-vulcanizing a vulcanizable oxidizable polymeric diene rubber composition in which has been incorporated prior to vulcanization from 0.1 to 10.0 weight percent on the rubber of a chemical compound comprising 1,2-bis(2-hydroxy-4,5-dimethylphenyl)propane.

11. The method of producing a sulfur-vulcanized oxidizable polymeric diene rubber product highly resistant to flex-cracking and having excellent aging, non-staining and non-discoloring properties, which method comprises sulfur-vulcanizing a vulcanizable oxidizable polymeric diene rubber composition in which has been incorporated prior to vulcanization from 0.1 to 10.0 weight percent on the rubber of a chemical compound comprising 1,2-bis(4-hydroxy-3,5-diisopropylphenyl)propane.

12. The method of producing a sulfur-vulcanized oxidizable polymeric diene rubber product highly resistant to flex-cracking and having excellent aging, non-staining and non-discoloring properties, which method comprises sulfur-vulcanizing a vulcanizable oxidizable polymeric diene rubber composition in which has been incorporated prior to vulcanization from 0.1 to 10.0 weight percent on the rubber of a chemical compound comprising 1-(2-hydroxy-4,5-dimethylphenyl)-2-(4-hydroxy-3,5-diisopropylphenyl)propane.

References Cited in the file of this patent

UNITED STATES PATENTS

| | | |
|---|---|---|
| 2,762,787 | Goodman et al. | Sept. 11, 1956 |
| 2,792,428 | Pikl | May 14, 1957 |
| 2,801,980 | Spacht | Aug. 6, 1957 |
| 2,801,981 | Spacht | Aug. 6, 1957 |
| 2,877,209 | Jansen | Mar. 10, 1959 |

OTHER REFERENCES

Shelton et al., Industrial and Engineering Chemistry, Vol. 46, No. 4, April 1954, pages 816–823.